(12) United States Patent
Visser et al.

(10) Patent No.: US 6,778,822 B1
(45) Date of Patent: Aug. 17, 2004

(54) DISTRIBUTED INTELLIGENT NETWORK TRIGGERING SYSTEM

(75) Inventors: John Visser, Nepean (CA); James A. Hodges, Ottawa (CA); Jackson Y. K. Chan, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 557 days.

(21) Appl. No.: 09/678,797
(22) Filed: Oct. 4, 2000
(51) Int. Cl.[7] .......................... H04Q 7/20; H04M 7/00
(52) U.S. Cl. ........................ 455/422.1; 455/432.1; 379/207.02; 379/221.08; 379/221.09; 379/221.12
(58) Field of Search .................. 455/433, 560, 455/507, 422.1, 412.1, 414.1, 432.1; 379/207.02, 201.01, 221.08, 219, 221.09, 221.12, 201.02, 221.13

(56) References Cited

U.S. PATENT DOCUMENTS

| | | | |
|---|---|---|---|
| 6,208,851 B1 | * | 3/2001 | Hanson |
| 6,373,930 B1 | * | 4/2002 | McConnell et al. |
| 6,393,269 B1 | * | 5/2002 | Hartmaier et al. |
| 6,453,161 B1 | * | 9/2002 | Touati et al. |
| 6,567,657 B1 | * | 5/2003 | Holly et al. |

\* cited by examiner

Primary Examiner—Sinh Tran
Assistant Examiner—Huy Nguyen
(74) Attorney, Agent, or Firm—L. Anne Kinsman; Borden Ladner Gervais LLP (57) ABSTRACT

A method and system for detecting and processing armed triggers associated with specific call functions in an intelligent network, using a distributed intelligent network triggering architecture. The complex trigger profile is removed from call processing at the service switching point to a trigger processing server, so that a much simplified and reduced profile can be sent to the service switching point associated with a roaming subscriber, which overcomes the problem of lack of support for long messages within the signalling infrastructure, and the problems associated with wide variation in the capabilities of service switching points. The reduced processing at the service switching point means that the detection points for armed triggers residing therein need only have a minimal triggering capability and a generic trigger for each detection point, and therefore do not need to be upgraded as new triggers are defined or as new criteria are defined for existing triggers at a given detection point. Such upgrades need only be dealt with in the trigger processing server and since the trigger processing server is normally part of the subscriber's home network, it can be upgraded as required to provide the subscriber with much greater consistency of services and features when roaming to other networks.

15 Claims, 6 Drawing Sheets

DISTRIBUTED INTELLIGENT NETWORK TRIGGERING SYSTEM

FIELD OF THE INVENTION

The present invention relates generally to improvements in intelligent telecommunications networks. More particularly, the present invention relates to a system and method for detecting and processing armed triggers using a distributed intelligent network triggering architecture.

BACKGROUND OF THE INVENTION

An intelligent network is a network architecture offering advanced services to telecommunication subscribers. Irrespective of the telecommunication network technology, intelligent networks enable network operators to provide a wide variety of telecommunications conveniences and services by allowing interaction with database systems and intelligent peripherals. The intelligent network is applicable to both fixed networks, where it is commonly referred to as an Advanced Intelligent Network (AIN), and to mobile networks, where it is referred to as a Wireless Intelligent Network (WIN). Outside North America, essentially the same technology is applied as European Telecommunications Standards Institute (ETSI) Core Intelligent Network Application Part (INAP) and Global System for Mobile Communication (GSM) Customized Applications for Mobile Network Enhanced Logic (CAMEL) for fixed and mobile networks, respectively. When a service subscriber/user requests an advanced service, thereby making an intelligent network call, the local exchange or serving mobile switching centre equipped with Service Switching Point (SSP) functionality processes the call, or it may transfer the call to an appropriately equipped exchange. For recognition and activation of an intelligent network service, the intelligent network architecture is characterized by the use of predefined triggers for the service, the triggers including the triggering criteria used for activation of the service. These triggers extend call processing through the execution of remote service logic stimulated in response to a predefined triggering stimulus (e.g., detection of certain dialled digits, specific call status events, etc.)

In the existing intelligent network architecture, detection of armed triggers, trigger condition checking and associated trigger processing all take place within the service switching point. After triggering on an incoming intelligent network call by checking and verifying that the trigger conditions have been met, the service switching point sends a message containing information on the initiating trigger and general call information to a service control point located in the same or a different location. During an intelligent network call, a number of such messages may be sent between the service switching point and the service control point. The service control point invokes appropriate service logic to analyze thie received message in order to identify the requested service. The service control point then issues one or more commands to the service switching point to initiate the appropriate actions to fulfil the requested service. The service control point may also provide charging information.

For a wireless subscriber, the location and subscriber data, including the trigger profile, (e.g., an ANSI-41 TriggerAddressList parameter), is stored in a home location register for the subscriber, and must be transferred to a visitor location register associated with a visited service switching point. Thus, the trigger profile must follow the subscriber during roaming, which requires the transfer of a complete list of triggers, each with its own service logic program address and possibly other criteria depending on the nature of the trigger. Thus, it is necessary that a complex WIN trigger profile be transferred along with the roaming subscriber for local processing in the visited service switching point in order to support the services subscribed to. This profile becomes more complex as more services and features are subscribed to. Even with only a few services, or with only a few instances of complex trigger criteria, a WIN trigger profile rapidly becomes unmanageable where the signalling infrastructure is limited to relatively short messages (e.g., 255 bytes in Signalling System No. 7 (SS7) Transaction Capabilities Application Part (TCAP), which is a nearly universal situation in existing networks).

Furthermore, WIN services, as well as ubiquitous offering of new AIN services across a wide area, are currently constrained by the requirement to use legacy service switching points having varying capabilities (e.g., for WIN services, the visited switch serving the roaming subscriber may support a more restricted set of triggers and processing than the home switch, and hence restricts the range of services that can be supported) and containing software which must be updated whenever new triggers are defined, or new criteria for an existing trigger are defined. This results in limitations on service offerings which must await the wide deployment of the required support or software updates to the service switching points before the services requiring these triggers can be offered. This problem is especially constraining in mobile networks which must support roaming subscribers potentially from anywhere on the globe.

Finally, consistent service inter-working for roaming subscribers requires that the same set of triggering and trigger criteria processing capabilities and processing be duplicated on multiple service switching points, thus escalating service deployment cost and complexity.

It is, therefore, desirable to provide a method and system which simplifies the profile required to be distributed to visited service switching points for roaming subscribers.

SUMMARY OF THE INVENTION

It is an object of the present invention to obviate or mitigate at least one disadvantage of previous systems and methods for detecting and processing armed triggers in intelligent networks.

Generally, the present invention provides a method and system for detecting and processing armed triggers associated with specific call functions in an intelligent network, using a distributed intelligent network triggering architecture. The complex trigger profile is removed from the service switching point to a trigger processing server, so that a much simplified and reduced profile can be sent to the service switching points with a roaming subscriber, which overcomes the problem of lack of support for long messages within the signalling infrastructure. The reduced processing at the service switching point means that the detection points for armed triggers residing therein need only have a minimal triggering capability and a generic trigger for each detection point, and therefore do not need to be upgraded as new triggers are defined or as new criteria are defined for existing triggers. Such upgrades need only be dealt with in the trigger processing server and since the trigger processing server is normally part of the subscriber's home network, or strategically located and shared amongst service providers through appropriate Service Level Agreements (SLAs), it can be upgraded as required to provide the subscriber with much greater consistency of services and features when roaming to other networks. This addresses the issue resulting from differences in SSP triggering capabilities implementation in a multi-vendor environment, and the related issue of differences in deployment of SSP software releases in a multi-operator environment, which is often the case for roaming subscribers.

In a first aspect, the present invention provides a trigger processing server for processing an armed trigger associated with an intelligent network call function. The trigger processing server consists of a trigger profile store, a trigger processor, and a call instruction aggregator. The trigger processor receives indication of armed triggers from remote detection points (i.e., SSPs), and then processes the armed triggers stored in the trigger profile store. The trigger processor then seeks call handling instructions from one or more remote service logic programs, as determined from the armed triggers, which are conventionally located at one or more service control points in the intelligent network, in respect of the authenticated triggers. The call instruction aggregator aggregates the call handling instructions received from the service logic programs, and, when all call handling instructions for armed triggers for a particular call have been received, instructs the service switching point to process the call according to the aggregated call handling instructions.

In a further aspect, there is provided an intelligent network switching system that includes the above trigger processing server, detection point(s), and service control point(s). The detection points can be located at service switching points, or at a terminal if the terminal has sufficient processing capabilities. If the intelligent network is a WIN, the service switching point is a mobile switching centre.

In yet another aspect, the present invention provides an intelligent network that includes the above intelligent network switching system, and an appropriate terminal capable of requesting an intelligent network call function and thereby arming a trigger. The intelligent network can be a wireless network, a fixed network, a circuit switched network, a packet-based network, or any combination thereof.

The present invention also includes a method for processing intelligent network call function triggers. The method commences by receiving an armed trigger at the trigger processing server, usually after its detection at a detection point remote from the trigger processing server. The armed trigger is then processed by comparison to a corresponding trigger profile stored at the trigger processing server. A call handling query in respect of the authenticated trigger is then transmitted to a service logic program at a service control point, and call handling instructions are received in response to the call handling query. Finally, when all call handling instructions have been received, they are transmitted to a service switching point for processing the call. The call handling instructions can be stored and aggregated until the trigger processing for the current detection point is completed.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for distributed intelligent network triggering.

Figure 1:
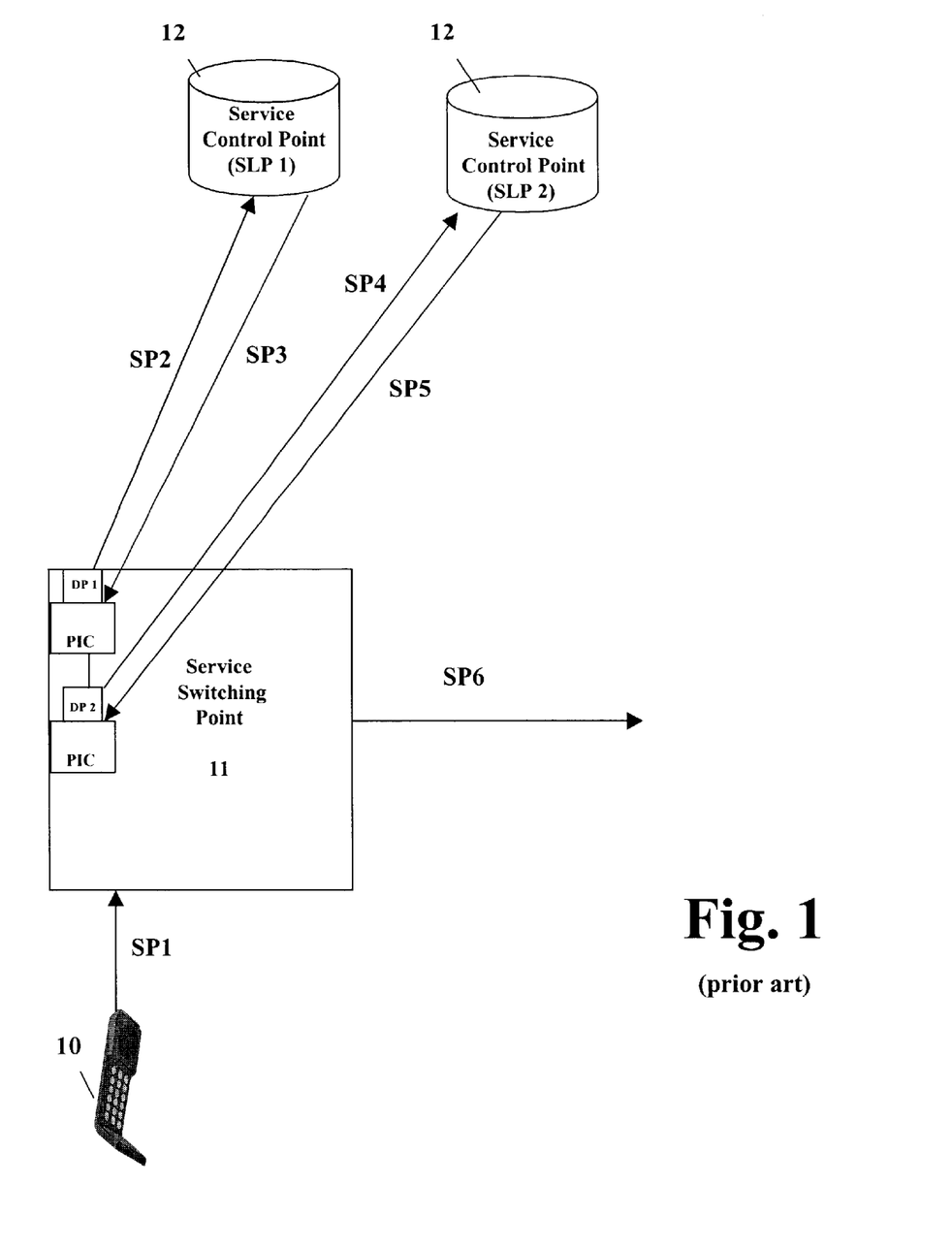
FIG. 1 is a schematic illustration of a prior art triggering system.

Referring now to the drawings, FIG. 1 schematically illustrates a prior art system for executing a triggering process, comprising a mobile or fixed terminal 10; a service switching point 11; and one or more service control points 12. The subscriber originates a call through the terminal 10, typically be a mobile wireless handset, which sends a signal along signal path SP1 to service switching point 11. The subscriber's trigger profile has previously been downloaded and stored in service switching point 11 as part of the registration process. In the WIN call model programmed in service switching point 11, a detection point DP-1 in the call model where the service will be triggered encounters an armed trigger, or triggers, associated with a particular call function. Each trigger is checked against the trigger criteria within the stored trigger profile and, if the criteria are satisfied, a query for call handling instructions is sent along signal path SP2 to a service logic program SLP-1 residing in service control point 12 at the address associated with the trigger. Service logic program SLP-1 responds with an appropriate call handling instruction signal (e.g., "Continue") along signal path SP3. Upon receipt of the call handling instruction at service switching point 11, further triggers armed at DP-1 are processed if armed, repeating the same steps. Once all armed triggers at DP-1 have been processed, the call transitions to the next detection point in the call model and subsequent armed trigger or triggers associated with another call function are detected at detection point DP-2. Again, each trigger is checked against the trigger criteria within the stored trigger profile and, if the criteria are satisfied, a query for call handling instructions is sent along signal path SP4 to a service logic program SLP-2 residing in the same or a different service control point 12 at the address associated with the second trigger. Service logic program SLP-2 returns an appropriate call handling instruction (e.g., "Continue") along signal path SP5. Upon receipt of the call handling instruction at service switching point 11, call processing may continue with the next process in the point-in-call or may be directed to another detection point preceding a point-in-call elsewhere in the call model. Unless otherwise instructed by the service logic programs, the service switching point call processing results in a call transition to the send call phase and the call is routed out of the switch to the called party's network.

It will be apparent from the foregoing that for mobile subscribers, the complete trigger profile must follow the subscriber in roaming scenarios for execution in the trigger processing function of the visited service switching point, with the attendant disadvantages discussed above.

Figure 2:
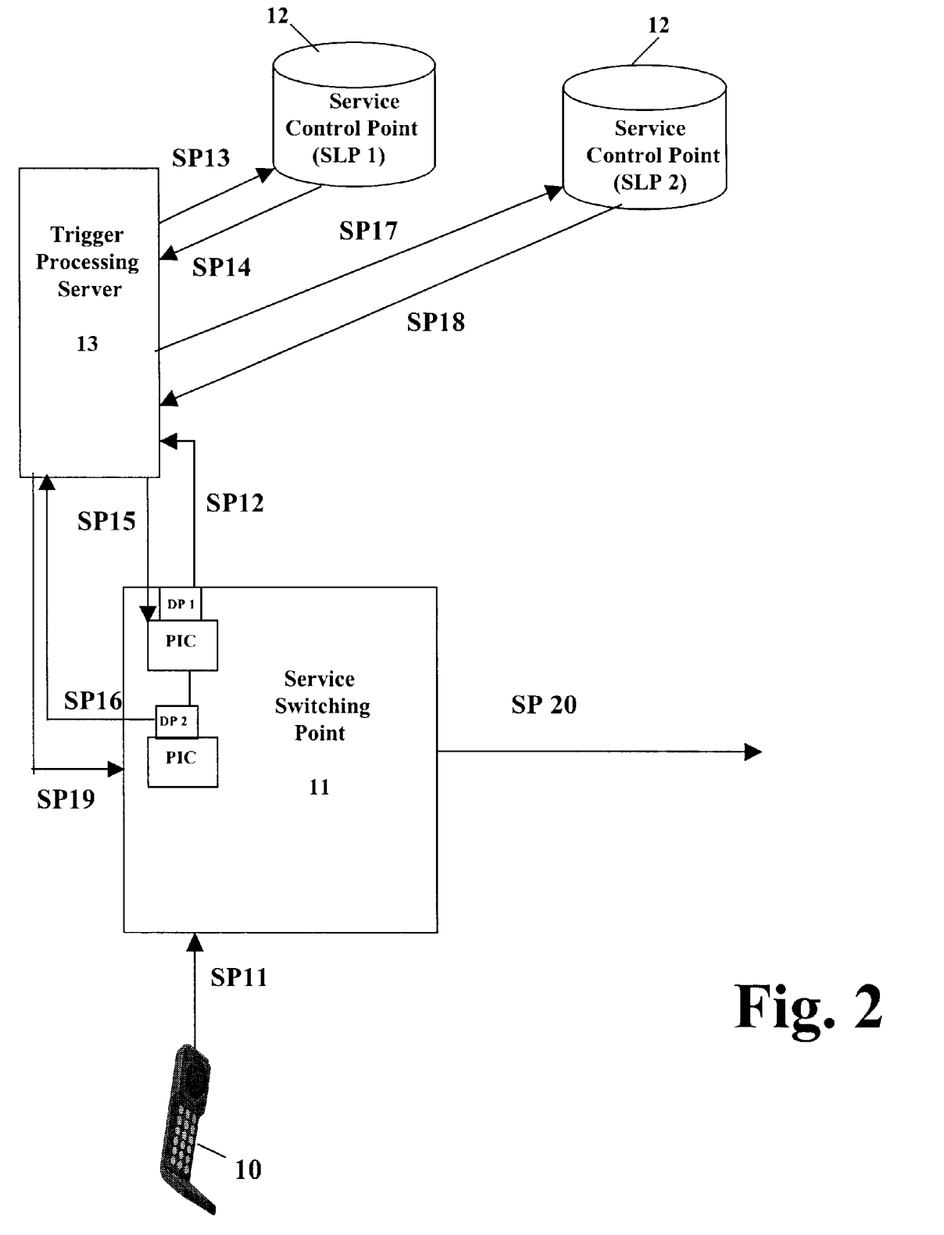
FIG. 2 is a schematic illustration of a triggering system according to a first embodiment of the invention.

Turning now to FIG. 2, there is illustrated a first embodiment of the invention, wherein the complexity of trigger processing is moved to a separate entity, namely, a trigger processing server 13, located between service switching point 11 and service control point 12. Trigger processing server 13 provides an instance of its functionality dedicated to an individual subscriber and is normally part of the subscriber's home network, or strategically located among service providers through appropriate Service Level Agreements (SLAs). Service switching point 11, service control point 12 and trigger processing server 13 communicate by means of the standard interfaces of the intelligent network and the communication protocols employed. The subscriber originates a call signal through the terminal 10 along signal path SP11. In accordance with the invention, the subscriber's full trigger profile is stored in trigger processing server 13, rather tan in service switching point 11. A minimal trigger profile for the subscriber, containing only a list of detection points at which armed triggers exist, but no triggering information, is provided to service switching point 11 as part of the subscriber registration process. No triggering conditions are included in this simplified profile. Only the address of thie subscriber's trigger processing server needs to be included with this simplified profile. Since there is a single such trigger processing server for a given subscriber, only one address is needed in the entire trigger profile provided to the service switching point 11, as opposed to the previous case where it was necessary to have a capability of supporting a separate address for each trigger. Service switching point 11 detects that there is at least one armed trigger at detection point DP-1 and sends the trigger along signal path SP12 to trigger processing server 13. At detection point DP-1 within service switching point 11, only the existence of a generic unconditionally armed trigger is considered and neither a specific trigger nor any criteria associated with the trigger are considered. Trigger processing server 13 recognizes the armed trigger associated with a particular call function and checks it against the trigger criteria within the stored trigger profile. If the criteria are satisfied, a query for call handling instructions is sent along signal path SP13 to the service logic program SLP-1 residing in service control point 12 at the service control point address associated with the trigger and stored at the trigger processing server 13. At the service control point address associated with the trigger, service logic program SLP-1 responds with an appropriate call handling instruction signal (e.g., "Continue") along signal path SP14 and the call handling instruction is stored in trigger processing server 13. Trigger processing server 13 processes any additional triggers and their associated criteria, then passes the aggregated call handling instructions back to service switching point 11 along signal path SP15. In this example, the switch is instructed to continue and the call transitions to the next process or point-in-call to another detection point DP-2 in the call model. Service switching point 11 detects that there is at least, one armed trigger at detection point DP-2 and sends the trigger to trigger processing server 13 along signal path SP16. Trigger processing server 13 recognizes the armed trigger and checks it against the trigger criteria within the stored trigger profile. If the criteria are satisfied, a query for call handling instructions is sent along signal path SP17 to the service logic program SLP-2 residing in service control point 12 at the service control point address associated with the trigger being processed. At the service control point address associated with the trigger, service logic program SLP-2 responds with an appropriate call handling instruction (e.g., "Continue") along signal path SP18. Again, trigger processing server 13 stores and, if multiple triggers for the current detection point have been processed, aggregates the call processing instructions received from service logic program SLP-2 and sends an instruction signal to service switching point 11 along signal path SP19. The call transitions to the send call phase and provided all criteria have been met, the call is routed out of the switch to the called party's network.

Figure 3:
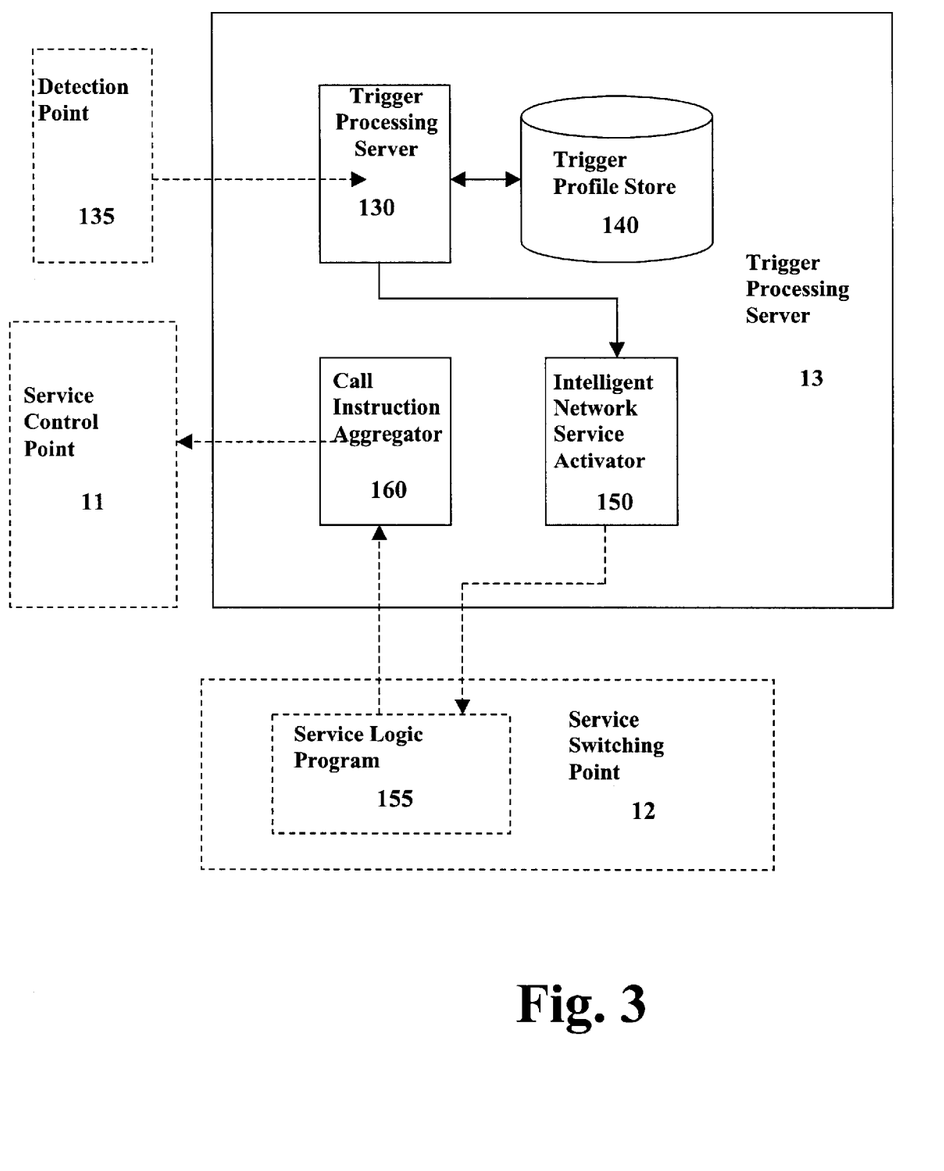
FIG. 3 is a schematic illustration of a trigger processing server according to the invention.

Turning now to FIG. 3, there is schematically illustrated a trigger processing server according to the invention. Within trigger processing server 13, a trigger processor, or processing function, 130 receives indication of an armed trigger which has been detected at a detection point 135. Detection point 135 may reside in service switching point 11, as in the embodiment of FIG. 2, or in another location such as in the embodiment of FIG. 6 described below. The trigger processing function 130 examines the trigger profile which has previously been stored at trigger profile store 140. When the trigger processing function 130 determines that an armed trigger's criteria have been satisfied, trigger processing function 130 instructs intelligent network service activator, or activating, 150 to query the service logic program 155 in service control point 12, which returns call handling instructions to a call instruction store and aggregator 160. The process is repeated for each of the armed triggers that the trigger processing function 130 finds in the portion of the trigger profile associated with the detection point 135 indicated when the initial indication was received. The call instruction aggregator function 160 aggregates the instructions received from the service logic programs associated with the respective triggers and passes call handling instructions to the service switching point 11.

Thus, it will be seen that trigger processing server 13 contains the trigger profile data for each subscriber registered to that trigger processing server. Since the complexities of the trigger profile are now transferred from the service switching point 11 to the trigger processing server 13, a much simplified and reduced profile can be sent to the service switching point 11 for a roaming subscriber, which means that the problem of lack of support for long messages within the signalling infrastructure is resolved. The reduced processing at the service switching point also means that the detection points need only have a minimal triggering capability and a generic trigger for each detection point, and therefore do not need to be upgraded as new triggers are defined or as new criteria are defined for existing triggers. Such upgrades need only be dealt with in the trigger processing server 13, and since the trigger processing server 13 is normally part of the subscriber's home network, or strategically located and shared amongst service providers through appropriate Service Level Agreements (SLAs), it can be upgraded as required to provide the subscriber with much greater consistency of services and features when roaming to other networks. This simplification of the trigger processing at service switching points also greatly eases the problems associated with different implementations in a multi-vendor environment, and with the deployment of different software releases in the service switching points in a given operator's serving area, or within a multi-operator environment common to subscriber roaming scenarios.

Figure 4A:
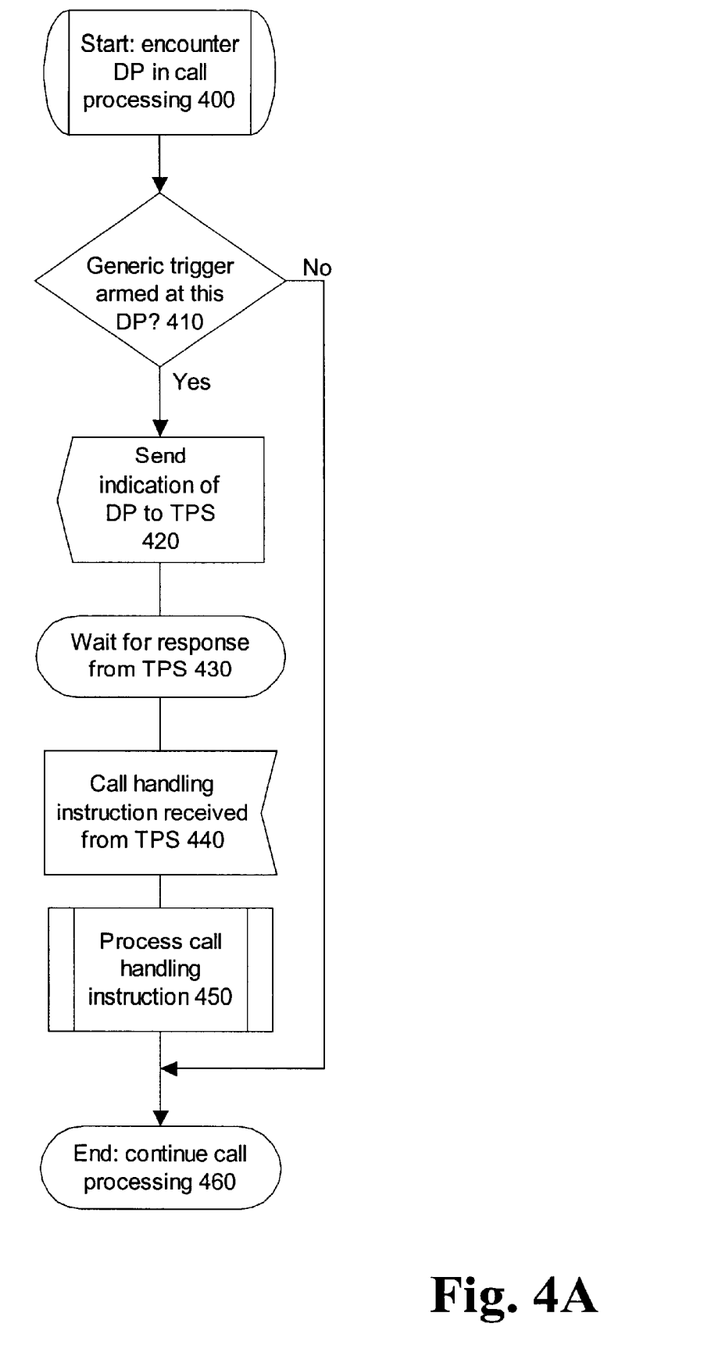
FIGS. 4A and 4B are flowcharts showing the method for generally processing a call, and for processing triggers at a trigger processing server, respectively.

FIG. 4A is a flow chart showing the method of processing a call according to the invention. The process starts by initiation of a call by a terminal, which can be any suitable terminal, such as a mobile wireless handset, standard wired telephone, personal computer having a modem, personal digital assistant (PDA), etc. The process is initiated when a detection point is encountered, at step 400. If an armed trigger is found at the detection point, located in a service switching point, or at some other location such as in the terminal itself, at step 410, then an indication of this, including a description of the call and its state is sent to the trigger processing server, at step 420. Otherwise call processing continues as if there were no detection point or trigger present, step 460. Once the indication has been sent to the trigger processing server, a response is awaited, at step 430. The response with call handling instructions is received, at step 440. The call handling instructions are processed, at step 450. If they indicate "Continue", then call processing does just that, at step 460, possibly with changed call information as may be included in the call handling instruction received.

Figure 4B:
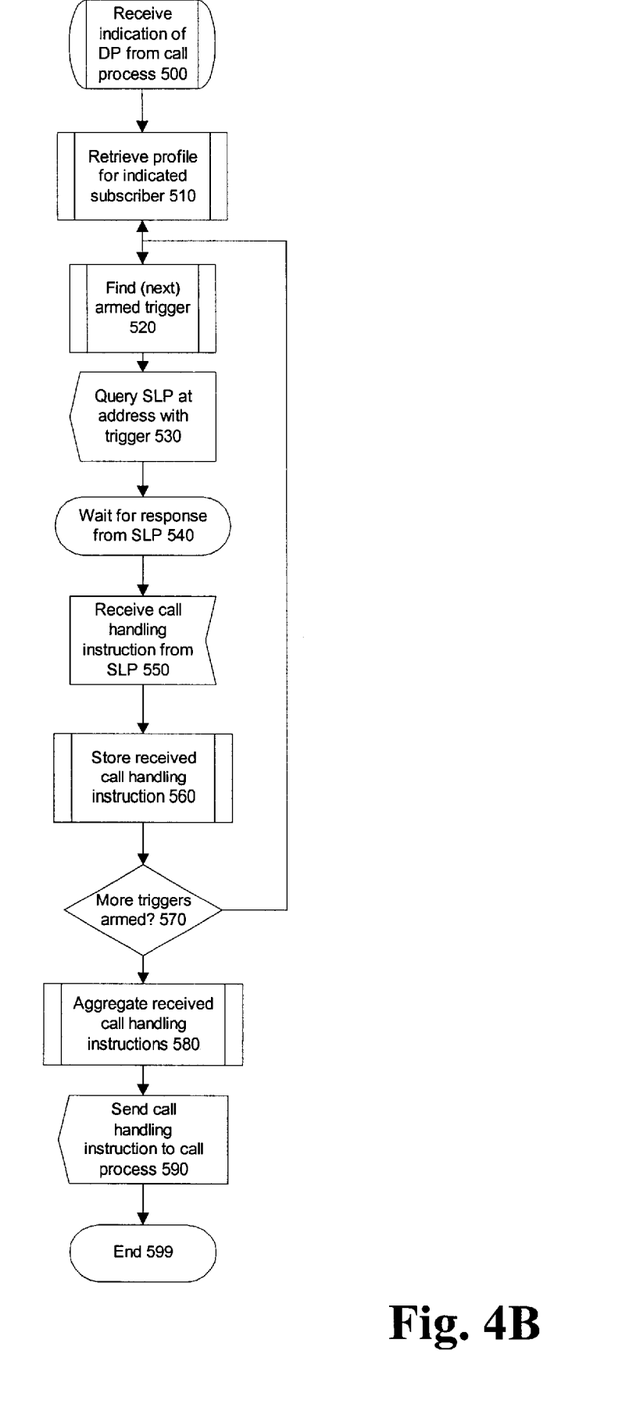

FIG. 4B is a flow chart showing the method of processing triggers at the trigger processing server according to the invention. The process at starts at the trigger processing server by receipt of an indication from a call process that a detection point with a generic armed trigger has been encountered, at step 500. The trigger processing server retrieves the user profile, at step 510, and extracts the first armed trigger whose criteria are matched, at step 520. (It may happen that there are no triggers whose criteria are matched, for example, if an armed trigger exists for certain dialled digits but those digits have not been dialled. In this case, the trigger processing server would return a simple "Continue" instruction. This is a normal case. It may also happen that an error has been made in the simplified trigger profile and it indicates the presence of armed triggers at a detection point when there are in fact no triggers armed at that detection point. This error situation is handled in the same way as if a trigger was armed but its criteria were not met.) The trigger processing server queries the service logic program at the service control point whose address is associated with the current trigger, at step 530. A response is awaited, at step 540. A call handling instruction is received from the service logic program, at step 550, and is stored, at step 560, pending processing of any further triggers associated with this detection point. A check for further armed triggers at this detection point is made, at step 570, and if any are found, steps 520 through 560 are repeated. Once all the triggers have been processed and all the service logic programs invoked, the received call handling instructions are aggregated, step 580, the result is returned to the call process, step 590, and trigger processing terminates, step 599.

With the removal of the complexity of trigger processing from the service switching point, leaving the service switching point with the much simplified and reduced profile, it becomes possible to execute the call model in a convenient location external to the service switching point. This external location may desirably be the terminal itself. For example, mobile wireless handsets already include significant processing power, and this is expected to continue to increase. Where the processing of the call relationship is separated from the handling of the user payload (e.g., voice, data, video, etc.) transfer functions, the service switching point need not be involved until user payload transfer resources need to be allocated. This further embodiment of the invention is illustrated in FIG. 5.

Figure 5:
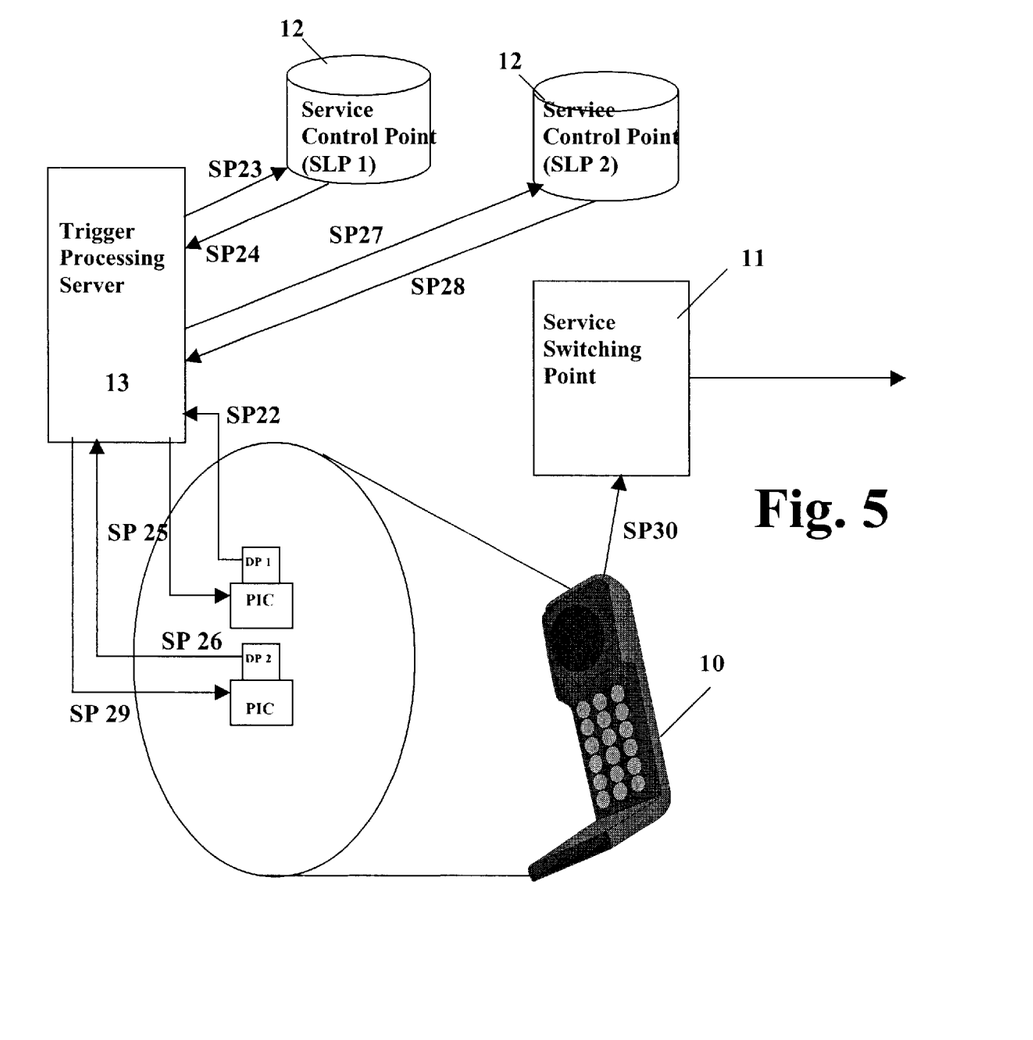
FIG. 5 is a schematic illustration of a triggering system according to a second embodiment of the invention.

Referring to FIG. 5, the subscriber originates a call through interaction with user interface provided by the terminal 10. Again, the subscriber's full trigger profile has been stored in trigger processing server 13. In this embodiment, however, a minimal trigger profile for the subscriber, containing only a list of detection points at which armed triggers exist but no triggering information, is provided to the terminal 10, rather than to the service switching point 11, as part of the subscriber registration process. Only the address of the subscriber's trigger processing server needs to be included with this simplified profile. Terminal 10 detects that there is at least one armed trigger at detection point DP-1 and passes the trigger signal along signal path SP22 to trigger processing server 13. At detection point DP-1, only the existence of a generic armed trigger is considered and neither a specific trigger nor any criteria associated with the trigger are considered. Trigger processing server 13 recognizes the armed trigger associated with a particular call function and checks it against the trigger criteria within the stored trigger profile. If the criteria are satisfied, a query for call handling instructions is sent along signal path SP23 to the service logic program SLP-1 residing at service control point 12 at the service control point address associated with the trigger. At the service control point address associated with the trigger, service logic program SLP-1 responds with an appropriate call handling instruction signal (e.g., "Continue") along signal path SP24. Trigger processing server 13 processes any additional triggers and their associated criteria, then passes the aggregated call handling instructions back to terminal 10, along signal path SP25.

In this example, the call process is instructed to continue and the call transitions to the next process or point-in-call and (as in the present example) to another detection point DP-2 in the call model. Terminal 10 detects that there is at least one armed trigger at detection point DP-2 and passes the trigger signal to trigger processing server 13 along signal path SP26. Trigger processing server 13 recognizes the armed trigger and checks it against the trigger criteria within the stored trigger profile. If the criteria are satisfied, a query for call handling instructions is sent along signal path SP27 to the service logic program SLP-2 residing in service control point 12 at the service control point address associated with the trigger. At the service control point address associated with the trigger, service logic program SLP-2 responds with an appropriate call handling instruction (e.g., "Continue") along signal path SP28. Again, trigger processing server 13 integrates the call processing instructions received from service logic program SLP-2 and sends an instruction signal to terminal 10 along signal path SP29. The call transitions to the send call phase and provided all criteria have been met, the connection is routed from the terminal 10 through the local exchange or serving mobile switching centre 11 using signalling path SP30 for allocation of user payload transfer resources, to the called party's network and thence to the called party's terminal.

It will be seen that the terminal 10 effectively replaces the processing functions of the service switching point of the first embodiment. The processing of the simplified profile stored in the terminal is required only to notify the trigger processing server of the presence of an armed trigger. Moving the trigger condition checking and associated trigger processing to a trigger processing server permits terminals in both home and roaming scenarios to be enabled to make use of advanced features. Separating trigger processing from the geographic location of the subscriber ensures independence from the capabilities of local call processing resources in service switching points in the first embodiment, and in terminals themselves in the second embodiment. This ensures that consistent service outcomes take place upon trigger detection and receive the same processing and service logic through the specific trigger processing server allocated to the subscriber. This approach ensures consistent services for subscribers whether in their home network or roaming in another network. It also leverages the growing capabilities of mobile terminals, and separates call handling from bearer channel handling. Many of the services supported by intelligent networks are independent of the bearer technology to be used, and hence there is no need for involving a bearer switching platform until call handling has determined that compatibility, user acceptance of the call and charging aspects have been agreed.

A key characteristic of the distributed approach which is fundamental to this invention is the separation of functions that are at the core of the intelligent network. Distributing these separated functions immediately enables their placement in any appropriate entity, as described in the above examples. Any appropriate mechanism to carry the messaging may then be used. Hence, this approach to distributing trigger processing fits naturally into an internet protocol (IP)-based core network infrastructure environment, as well as into an extended environment involving IP capabilities for the mobile or fixed terminal interfacing to the end user.

The interface between the trigger processing server and the service control point (FIG. 2) is the same as the existing interface between the service switching point and the service control point (FIG. 1). The interface between the call process (whether at the service switching point or in the terminal) and the trigger processing server is a subset of the existing interface between the service switching point and the service control point (FIG. 1), with a simplified set of triggers (only one per detection point and each of which may be armed only as "unconditional"). Hence, the impact on existing standards is limited to a simplified TriggerAddressList parameter in place of the complex parameter required by legacy service switching points, plus a description of the simplified triggers in the same style as existing "unconditional" triggers such as the "All Calls" trigger. That is, within the interface specifications according to existing standards, only the specification of the TriggerAddressList parameter's contents needs to be adjusted. The interface between the home location register and the service switching point/visitor location register in which the simplified trigger profile is placed is similarly affected only through simplification of the TriggerAddressList parameter.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A trigger processing server, comprising:
a trigger profile store operable to store a full trigger profile of a subscriber, the full trigger profile having predefined trigger criteria for triggers associated with intelligent network call functions;
a trigger processor operable to receive, from a service switching point in a wireless intelligent network remote from a home network associated with the subscriber and having a minimal trigger profile for the subscriber retrieved from the home network, a generic unconditionally armed trigger, and operable to process the generic unconditionally armed trigger by comparing the generic unconditionally armed trigger to the trigger criteria, and operable to obtain call handling instructions, corresponding to the processed trigger, from a remote service control point when the trigger criteria are satisfied, the call handling instructions determined in accordance with the intelligent network call functions; and
a call instruction aggregator operable to aggregate the call handling instructions received from the service control point, and to provide the service switching point with the aggregated call handling instructions.

2. The trigger processing server according to claim 1, wherein an intelligent network service activator function receives a call handling query from the trigger processor function, and passes the call handling query to the remote service control point.

3. An intelligent network switching system, comprising:
a trigger processing server having a trigger profile operable to store a full trigger profile of a subscriber, the full trigger profile having predefined trigger criteria for triggers associated with an intelligent network call function, a trigger processor operable to receive, from a service switching point in a wireless intelligent network remote from a home network associated with the subscriber and having a minimal trigger profile for the subscriber retrieved from the home network, a generic unconditionally armed trigger, and operable to process the generic unconditionally armed trigger by comparing the generic unconditionally armed trigger to the trigger criteria, and operable to obtain call handling instructions, corresponding to the processed trigger, from a remote service control point when the trigger criteria are satisfied, the call handling instructions determined in accordance with the intelligent network call function, an intelligent network service activator function operable to receive a call handling query from the trigger processor, and operable to pass the call handling query to the remote service control point, and a call instruction aggregator operable to aggregate the call handling instructions received from the service control point, and to provide the service switching point with the aggregated call handling instructions
a detection point, remote from the trigger processing server, operable to detect the generic unconditionally armed trigger and to transmit the generic unconditionally armed trigger to the trigger processing server; and
a service logic program resident in the service control point operable to receive the call handling query and operable to transmit call handling instructions to the call instruction aggregator.

4. The intelligent network switching system according to claim 3, wherein the detection point residues in the service switching point.

5. The intelligent network switching system according to claim 4, wherein the service switching point is a mobile switching centre.

6. The intelligent network switching system according to claim 3, wherein the detection point resides in a terminal.

7. An intelligent network, comprising:
a terminal for initiating a call requesting an intelligent network call function and thereby invoking a generic armed trigger;
a trigger processing server having a trigger profile operable to store a full trigger profile of a subscriber, the full trigger profile having predefined trigger criteria for triggers associated with the intelligent network call function, a trigger processor for receiving, from a service switching point in a wireless intelligent network remote from a home network associated with the subscriber and having a minimal trigger profile for the subscriber retrieved from the home network, a generic unconditionally armed trigger and, operable to process the generic unconditionally armed trigger by comparing the generic unconditionally armed trigger to the trigger criteria, and operable to obtain call handling instructions, corresponding to the processed trigger, from a remote service control point when the trigger criteria are satisfied, the call handling instructions determined in accordance with the intelligent network call function, an intelligent network service activator function operable to receive a call handling query from the trigger processor, and to pass the call handling query to the remote service control point, and a call instruction aggregator operable to aggregate the call handling instructions received from the service control point, and to provide the service switching point with the aggregated call handling instructions a detection point, remote from the trigger processing server, operable to detect the generic unconditionally armed trigger and to transmit the generic unconditionally armed trigger to the trigger processing server; and a service logic program resident in the service control point operable to receive the call handling query and to transmit the call handling instructions to the call instruction aggregator.

8. The intelligent network according to claim 7, wherein the terminal is a mobile terminal.

9. The intelligent network according to claim 7, wherein the intelligent network is fixed.

10. The intelligent network according to claim 7, wherein the intelligent network is wireless.

11. A method for processing intelligent network call function triggers, comprising:

(i) receiving a generic unconditionally armed trigger at a trigger processing server from a service switching point in a wireless intelligent network remote from a home network associated with a subscriber and having a minimal trigger profile for the subscriber retrieved from the home network;

(ii) processing the generic unconditionally armed trigger by comparing the generic unconditionally armed trigger to trigger criteria associated with the intelligent network call function triggers stored in full trigger profile stored at the trigger processing server;

(iii) transmitting a call handling query to a service control point in the home network with respect to the processed trigger when the trigger criteria are satisfied;

(v) receiving call handling instructions from the service control point in response to the call handling query; and (vi) transmitting the call handling instructions to the service switching point for processing a call.

12. The method according to claim 11, wherein receiving the generic unconditionally armed trigger is preceded by detecting the generic unconditionally armed trigger at a detection point located remote from the trigger processing server.

13. The method according to claim 11, wherein transmitting the call handling query includes sending sending the call handling query to a service logic program residing in the service control point in an intelligent network.

14. The method according to claim 11, wherein receiving the call handling instructions includes storing the call handling instructions corresponding to the call.

15. The method according to claim 11, wherein receiving the call handling instructions includes aggregating the call instructions corresponding to the call.

* * * * *